Patented May 5, 1942

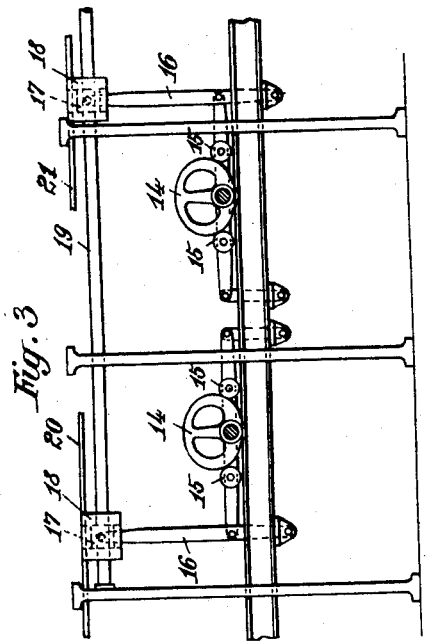
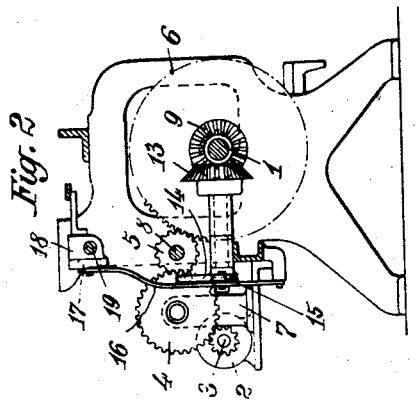
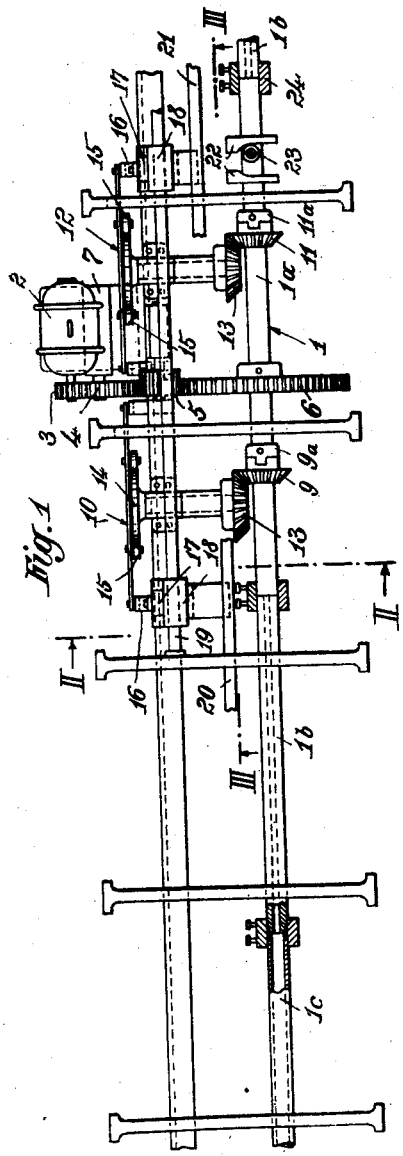

2,281,702

UNITED STATES PATENT OFFICE 2,281,702

STRAIGHT BAR KNITTING MACHINE

Karl Richard Lieberknecht, Oberlungwitz, Germany, assignor to Kalio, Inc., New York, N. Y., a corporation of New York Application April 13, 1939, Serial No. 267,549
In Germany April 16, 1938

9 Claims. (Cl. 66—82)

Straight bar knitting machines, usually consisting of a fairly large number of divisions of the same kind are driven by means of a common driving shaft, the cam shaft, which runs through all the divisions. As a rule, this shaft is driven from one point—e. g., the middle of the shaft. Owing to the great length of the driven parts of the shaft and their loads which decrease as the distance from the driving point or points increases, this shaft tends to undergo vibration which results in uneven working of the machine. Attempts have been made to damp these vibrations by increasing the diameter of the cam shaft, but this method has been found to be unsatisfactory owing to the increase in weight which results. As is known, the cam shaft frequently has to be displaced in the axial direction and a great weight is disadvantageous for this purpose.

With the object of avoiding vibration of the cam shaft even if the latter is of small diameter, the invention provides that the drives mounted on the cam shaft, of the devices which come into operation on the machine only once or only a few times or the drives only of those of the said devices which require the greatest expenditure of power—e. g., the loop-sinking device—are arranged in proximity to the driving wheel or driving wheels of the cam shaft.

According to a preferred embodiment of the invention, the drive of the cam shaft is effected approximately at the middle of the shaft and, instead of the single coulier motion device usually employed hitherto, two coulier motion devices are provided, one being arranged to operate the usual friction driving bar of the machine, and the other the slur-cock bar. These coulier motion devices have separate drives, one drive being arranged on the cam shaft on the left of the driving wheel of the cam shaft and the other drive being arranged on the cam shaft on the right of the driving wheel of the cam shaft. In addition, the usual cam shaft axial shift cam, which requires a considerable expenditure of power, is fitted on the shaft next to—i. e., in proximity to—the drive.

In the construction, in which the essential gears, which produce torsion, are arranged in the immediate vicinity and, advantageously, on both sides of the drive of the cam shaft, harmful torsion of the cam shaft is avoided, since the cams for the movement of the loop-forming parts particularly the needles, which cams are located in separate divisions, exert an inconsiderable influence only on the torsion of the shaft.

A further advantage of this method of construction is that it is no longer necessary to provide a shaft that is of equal thickness throughout its length. Since, owing to the possibility of the cams in the different divisions being exchanged, the external diameter of the shaft must be constant throughout, the said shaft, according to the invention, is made hollow wholly or in part and the internal diameter of the hollow part thereof is graded in accordance with the torsional strain which occurs in operation, and which decreases with increasing distance from the drive of the shaft.

For example, a solid piece of shaft is used adjacent to the drive of the cam shaft and within reach of the drives of the auxiliary devices which drives are affixed in proximity to the drive of the cam shaft, whilst, towards the outside, pieces of hollow shaft are coupled, the internal diameter of the outer parts of the shaft being greater than the internal diameter of the parts that lie towards the centre of the shaft. Such a construction of the shaft has the advantage that the weight of the cam shaft that is to be shifted to and fro is smaller, so that, for example, longer machines can be constructed without causing the cam shaft to be heavier than has hitherto been the case.

The invention is not restricted to the driving of the cam shaft at one point; the invention can also be used in the case of knitting machines in which the cam shaft is driven at a number of points from a special auxiliary shaft.

The drawing shows an embodiment of the invention by way of example. In the drawing, Fig. 1 is a plan of the middle part of a straight bar knitting machine with a driving arrangement according to the invention;

Fig. 2 is a section on the line II—II of Fig. 1; and

Fig. 3 is a section on the line III—III of Fig. 1.

In the drawing, the cam shaft is denoted by 1. The shaft is driven by an electromotor 2 through toothed wheels 3, 4, 5 and 6. The toothed wheel 3 is mounted on the shaft of the motor, the toothed wheel 4 is mounted on an arm 7; the toothed wheel 5 is mounted on a shaft 8 that is rotatably mounted in the knitting machine and the toothed wheel 6 is fixed on the cam shaft 1 so as to impart rotation to it. Fig. 1 shows only a few divisions of the knitting machine. The toothed wheel 6 is mounted at about the middle of the cam shaft 1.

As shown in Figs. 1 and 3, two coulier motion devices are provided. The driving pinion 9 of the coulier motion device 10 is mounted on the left of the toothed wheel 6 and in proximity thereto.

The driving pinion 11 of the coulier motion device 12 is mounted on the right of the tooth wheel 6 and likewise in proximity thereto. In this way, the torque which is necessary for driving the coulier motion devices 10 and 12, is taken from the right and left of the driving wheel 6 from positions in immediate proximity thereto, so that the remaining parts of the cam shaft 1 are not loaded.

The coulier motion devices themselves are of known construction. The said pinions 9 and 11 can be coupled with the cam shaft by the clutches 9a and 11a respectively as required; this can be done by hand or by means of the pattern mechanism of the machine. The pinions 9 and 11, which are in the form of bevel wheels, drive the bevel wheels 13 which are mounted on the same shaft as the sinker cams 14. The sinker cams, in turn, drive the levers 16 through the rollers 15. Every lever 16 is pivoted to a block 17 which is mounted so as to be capable of sliding in a carriage 18. The carriages 18, which are displaceable along the shaft 19, are connected with the slur-cock bar 20 or with a bar 21 for driving the carrier rods.

As shown in Fig. 1, the cam shaft consists of a number of parts, including a solid part 1a which carries the driving wheel 6 and the driving pinions 9 and 11 and, in addition, the cam shaft axial shift cam 22. This is, in this case, a cam shaft axial shift cam of known construction which, with the aid of the roller 23, effects the axial displacement of the cam shaft. Further parts 1b and 1c of the shaft are connected with the part 1a of the shaft by couplings 24. The parts 1b and 1c of the shaft are hollow and differ from each other in the size of their internal diameters. The greater the distance of the part of the shaft from the driving wheel 6, the greater the internal diameter.

I claim:

1. In a straight bar multiple section flat knitting machine having a main cam shaft extending substantially throughout the machine length, driving means for said cam shaft which comprises a motor located centrally of the machine, and a single driving connection with the cam shaft comprising a driving train from said motor connecting substantially with the middle of said cam shaft, and mechanism for effecting axial shifting movements of said cam shaft acting on the cam shaft in close proximity to said driving connection on the middle portion of said cam shaft, said cam shaft being comprised of a plurality of sections of different weight and corresponding torque load resist value including a relatively heavy middle cam shaft section and progressively lighter sections on each side thereof toward the ends of the cam shaft corresponding with the decrease in torque load on the cam shaft.

2. In a straight bar multiple section flat knitting machine having a main cam shaft extending substantially throughout the machine length, driving means for said cam shaft which comprises a motor, and a single driving connection with the cam shaft comprising a driving train from said motor connecting substantially with the middle of said cam shaft, a slur-cock bar, a carrier driving rod, coulier motion driving means for said bar and rod having connection with the main cam shaft in close proximity to said cam shaft driving means, said cam shaft being comprised of a plurality of sections of different weight and corresponding torque load resist value including a relatively heavy middle cam shaft section and progressively lighter sections on each side thereof toward the ends of the cam shaft corresponding with the decrease in torque load on the cam shaft.

3. In a straight bar multiple section flat knitting machine having a main cam shaft extending substantially throughout the machine length, driving means for said cam shaft which comprises a motor, and a single driving connection with the cam shaft comprising a driving train from said motor connecting substantially with the middle of said cam shaft, a slur-cock bar, a carrier driving rod, and separate coulier motion driving devices for said bar and rod having connection with the main cam shaft in close proximity to and at opposite sides of said cam shaft driving means, said cam shaft being comprised of a plurality of sections of different weight and corresponding torque load resist value including a relatively heavy middle cam shaft section and progressively lighter sections on each side thereof toward the ends of the cam shaft corresponding with the decrease in torque load on the cam shaft.

4. In a straight bar multiple section flat knitting machine having a main cam shaft extending substantially throughout the machine length, driving means for said cam shaft which comprises a motor, and a single driving connection with the cam shaft comprising a driving train from said motor connecting substantially with the middle of said cam shaft, a slur-cock bar, a carrier driving rod, coulier motion driving means for said bar and rod having connection with the main cam shaft in close proximity to said cam shaft driving means, and mechanism for effecting axial shifting movements of said cam shaft acting on the cam shaft at a point in close proximity to said cam shaft driving means, said cam shaft being comprised of a plurality of sections of different weight and corresponding torque load resist value including a relatively heavy middle cam shaft section and progressively lighter sections on each side thereof toward the ends of the cam shaft corresponding with the decrease in torque load on the cam shaft.

5. In a straight bar multiple section flat knitting machine having a main cam shaft extending substantially throughout the machine length, driving means for said cam shaft which comprises a motor, and a driving connection with the cam shaft comprising a driving train from said motor connecting with said cam shaft, said cam shaft being comprised of a plurality of sections of different weight and corresponding torque load resist value, progressively lighter sections being employed with increased distance from the connection with the driving means in accordance with the decrease in torque load on the cam shaft.

6. In a straight bar multiple section flat knitting machine having a main cam shaft extending substantially throughout the machine length, driving means for said cam shaft which comprises a motor, and a driving connection with the cam shaft comprising a driving train from said motor connecting substantially with the middle of said cam shaft, said cam shaft being comprised of a plurality of sections of different weight and corresponding torque load resist value including a relatively heavy middle cam shaft section and progressively lighter sections on each side thereof toward the ends of the cam shaft corresponding with the decrease in torque load on the cam shaft.

7. In a straight bar multiple section flat knitting machine having a main cam shaft extending substantially throughout the machine length, driving means for said cam shaft which comprises a motor, and a single driving connection with the cam shaft comprising a gear driving train from said motor connecting substantially with the middle of said cam shaft, said cam shaft being comprised at least in part of hollow sections, the internal diameter of said hollow sections increasing with the increasing distance from the connection of the driving means with said cam shaft.

8. In a straight bar multiple section flat knitting machine having a main cam shaft extending substantially throughout the machine length, driving means for said cam shaft which comprises a motor, and a single driving connection with the cam shaft comprising a driving train from said motor connecting substantially with the middle of said cam shaft, said cam shaft comprising a solid middle section connecting with said driving train, and at each side thereof a plurality of additional hollow sections, the internal diameter of said hollow sections being successively increased to the ends of said cam shaft.

9. In a straight bar multiple section flat knitting machine, a main cam shaft extending substantially throughout the machine length and comprising a solid middle section and a plurality of hollow sections at each side thereof of increasing internal diameter to the ends of the cam shaft, driving means for said cam shaft which comprises a motor and a single driving connection with the cam shaft comprising a driving train from said motor connecting with said solid cam shaft section, mechanism for effecting axial shifting movements of said cam shaft acting on said solid cam shaft section, a slur-cock bar, a carrier driving rod, and coulier motion driving means for said bar and rod having connection with said solid cam shaft section.

KARL RICHARD LIEBERKNECHT.